Patented Aug. 3, 1937

2,088,920

UNITED STATES PATENT OFFICE 2,088,920

MANUFACTURE OF ARTICLES FROM VULCANIZED RUBBER

Francis Norman Pickett, Westminster, London, England, assignor to United States Rubber Products, Inc., New York, N. Y., a corporation of Delaware No Drawing. Application February 2, 1935, Serial No. 4,651

10 Claims. (Cl. 18—52).

This invention relates to the manufacture of articles from vulcanized rubber and has for its object to provide means for rendering vulcanized rubber useful for such purposes.

According to the present invention, vulcanized rubber is rendered plastic so that it can be molded into any desired form, and by the addition of vulcanizing material revulcanized.

It has been found that substitute derivatives of guanidine, such as diphenylguanidine or D. P. G., have a plasticizing or devulcanizing action upon vulcanized rubber such as tire tread rubber, and by suitable application of this discovery waste rubber has been devulcanized and sheeted so that it may be recompounded and revulcanized. The result is more rapid and satisfactory the smaller the amount of free sulphur in the waste rubber.

It is an advantage to secure the intimate mixing of the D. P. G. with the waste rubber, and this is obtained by first reducing the rubber to a finely divided and homogeneous state, and the powder must be passed through a sieve to exclude overlarge particles, and the required amount of D. P. G. added. The mixture is preferably placed in a mixing mill of the friction type and thoroughly worked.

The mixture is then preferably placed in an autoclave and subjected to steam pressure of 60 lbs. per square inch for such time as will allow the D. P. G. to melt or soften and act upon the comminuted rubber. Any other suitable method of heating may be used.

After such treatment the rubber will be found to be sufficiently plastic that on placing the mixture in the mill and working, the comminuted particles adhere and the rubber can be sheeted.

The quantity of D. P. G. to be added is from one per cent to five per cent. The smaller percentage requires a longer time in the autoclave than the larger percentage, and the amount of plasticity is greater with the higher percentage. Higher percentages of D. P. G. than five can of course be used, but five per cent gives sufficient plasticity for practical purposes.

It is now only necessary to add sulphur and if desired other reinforcing and filling agents in the correct proportion desired to the plastic sheet or mass, to produce a compounded rubber which on vulcanization will have physical properties little if any inferior to those of the original vulcanized rubber that has been treated.

Having thus described my invention, what I claim and desire to protect by Letters Patent is:

1. That method of devulcanizing soft vulcanized rubber which comprises comminuting the vulcanized rubber, mixing therewith diphenylguanidine, and heating and working the mixture into a plastic homogeneous condition.

2. That method of devulcanizing soft vulcanized rubber which comprises comminuting the vulcanized rubber, mixing therewith one to five percent of diphenylguanidine, and heating and working the mixture into a plastic homogeneous condition.

3. That method of devulcanizing soft vulcanized rubber which comprises comminuting the vulcanized rubber, mixing therewith diphenylguanidine, and heating and working the thus treated mixture on a mill into a plastic homogeneous sheet.

4. That method of treating soft vulcanized rubber which comprises comminuting the rubber, mixing therewith diphenylguanidine, and heating and working the same into a plastic homogeneous condition, adding sulphur, with or without compounding ingredients, shaping, and revulcanizing.

5. That method of treating soft vulcanized rubber which comprises comminuting the rubber, mixing therewith 1 to 5% of diphenylguanidine, and heating and working the same on a mill into a plastic homogeneous sheet, adding sulphur, with or without compounding ingredients, shaping and revulcanizing.

6. Renewed soft vulcanized rubber mechanically plasticized with diphenylguanidine.

7. A process for renewing the plastic properties of soft vulcanized rubber which comprises incorporating diphenylguanidine therewith.

8. A process for renewing the plastic properties of soft vulcanized rubber which comprises comminuting soft vulcanized rubber, mixing it with diphenylguanidine, and heating the mixture.

9. A process for renewing the plastic properties of soft vulcanized rubber which comprises mixing soft vulcanized rubber in a comminuted condition with diphenylguanidine, heating the mixture, and then masticating it.

10. A process for renewing the plastic properties of soft vulcanized rubber which comprises incorporating diphenylguanidine with soft vulcanized rubber in a comminuted condition.

FRANCIS NORMAN PICKETT.